July 21, 1936.  W. P. CHANDLER, JR  2,048,179
CONTACT APPARATUS FOR LIQUID AND GAS
Filed Oct. 23, 1934   2 Sheets-Sheet 1
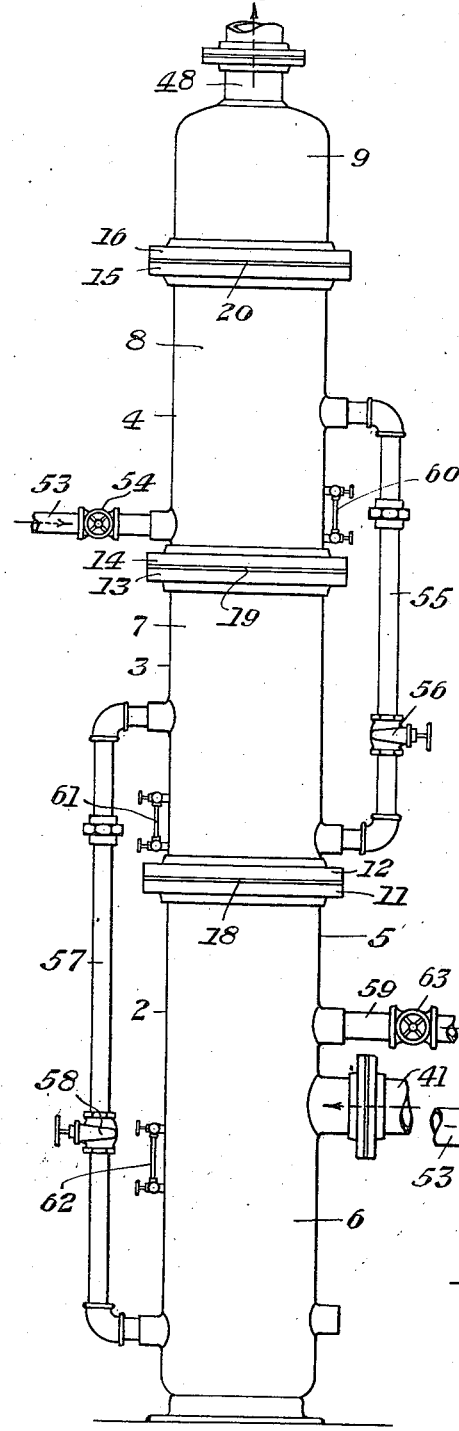
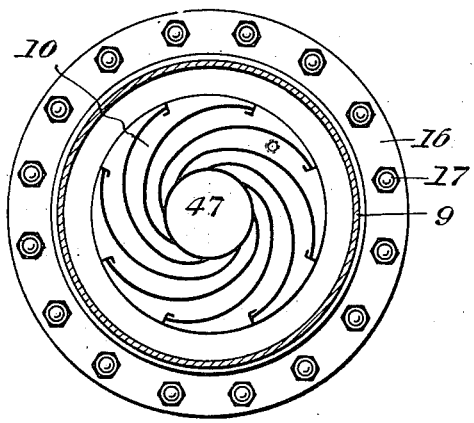
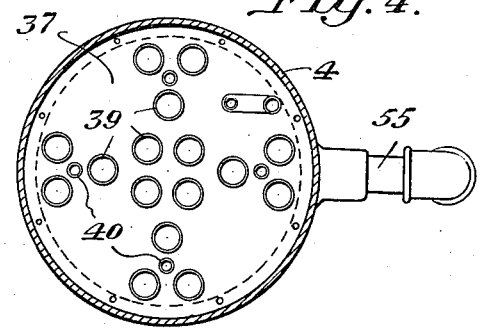
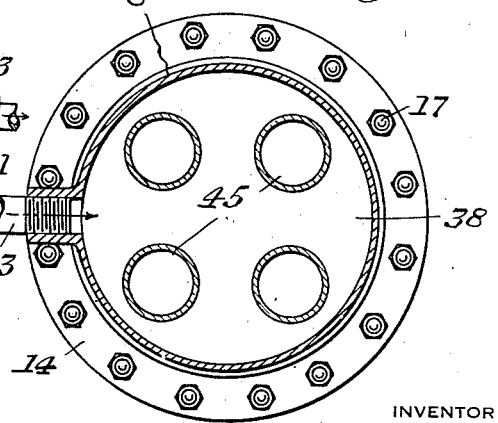
INVENTOR July 21, 1936.   W. P. CHANDLER, JR   2,048,179
CONTACT APPARATUS FOR LIQUID AND GAS
Filed Oct. 23, 1934   2 Sheets-Sheet 2
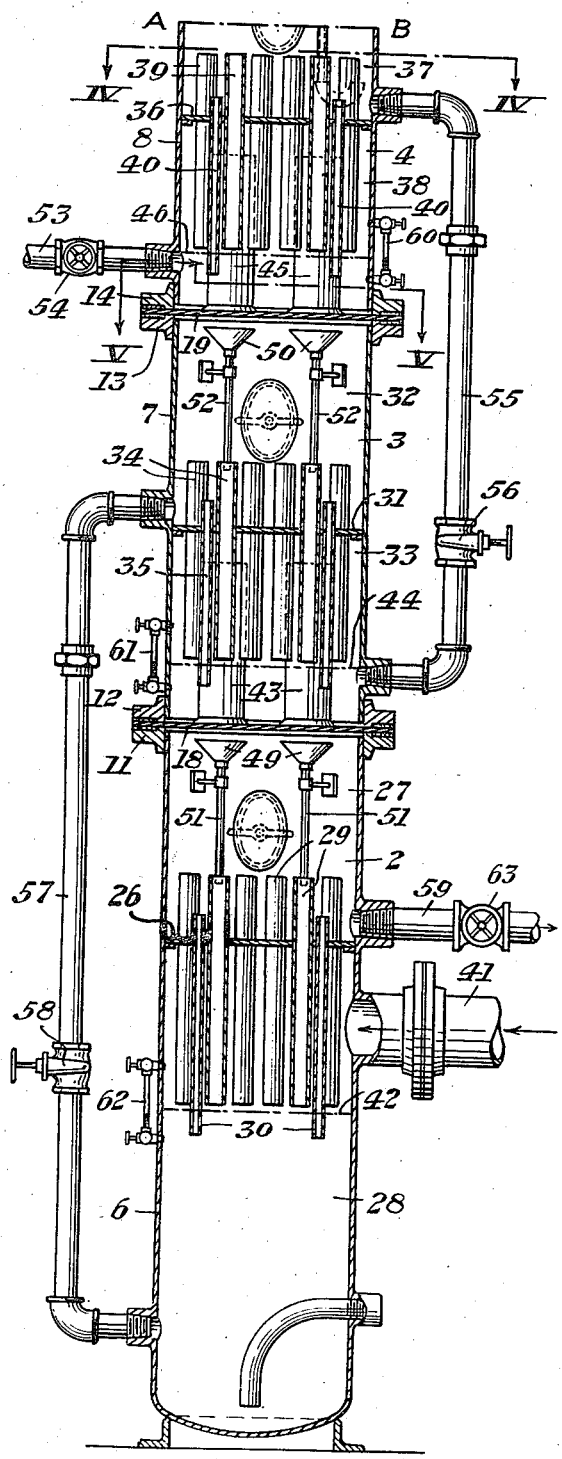
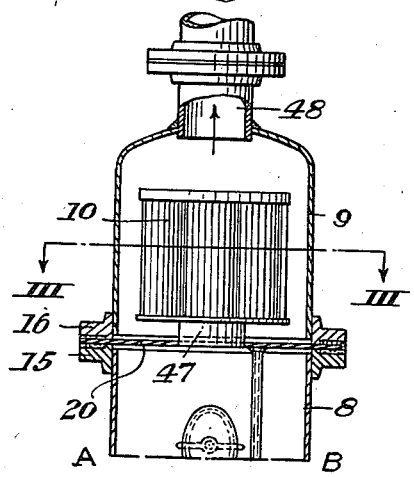
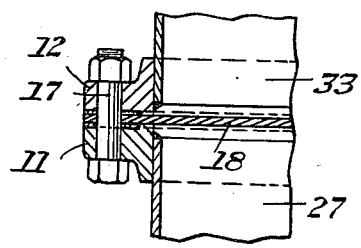
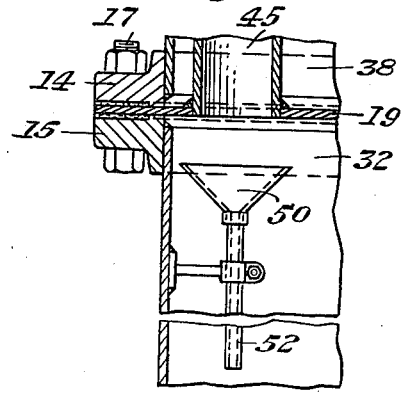
INVENTOR Patented July 21, 1936

2,048,179

UNITED STATES PATENT OFFICE 2,048,179

CONTACT APPARATUS FOR LIQUID AND GAS

Willard P. Chandler, Jr., Pittsburgh, Pa., assignor to Blaw-Knox Company, Pittsburgh, Pa., a corporation of New Jersey Application October 23, 1934, Serial No. 749,598

2 Claims. (Cl. 261—21)

The present invention relates generally to contact apparatus for liquid and gas, and more particularly to apparatus embodying a plurality of contact units arranged in such manner that intimate contact between the liquid and the gas may be effected most efficiently.

There are many instances where it is desirable to bring about an intimate contact between a liquid and a gas for the purpose of imparting a constituent or constituents to the gas from the liquid, or for the purpose of taking something from the gas for the purpose of purifying it or for the purpose of altering the character of the liquid or gas. For instance, there are many chemical processes in which chemical reactions take place between materials, one of which is a gas and the other a liquid and it is desirable to bring the liquid and gas into intimate contact with each other in the carrying out of this chemical reaction. Whether the purpose is to absorb something from the gas or whether it is to cause the gas to take up something from the liquid, the intimate mixture brought about in the apparatus which I provide enables the desired results to be obtained most efficiently and effectively.

Another instance wherein my invention is particularly useful is where the gas contains particles of dust or the like and it is desirable to remove the dust or the like from the gas. The liquid to which such particles will adhere is brought into intimate contact with the gas and the dust effectively removed. If the gas contains not merely a dust but a mist or a fog which may be described as fine drops or bubbles, there will be employed in the process a liquid of such character as to absorb the material of which the drops or bubbles are composed.

A still further field of usefulness for the apparatus which I provide is that of imparting heat to the gas or absorbing heat therefrom. When either of these results is desired, a liquid which is inert to the gas and which has a higher or a lower temperature than the gas when the contact is effected may be employed.

It will be obvious to those skilled in the art that the apparatus which I provide may be used in the accomplishment of almost an infinite number of objects. It is not limited to the performance of one particular reaction or function but may be utilized for several different reactions at the same time in the same piece of apparatus.

In the apparatus which I provide the gas is brought into contact with the liquid while the latter is in a finely divided state and therefore the absorbing or emitting action will take place between the liquid and the gas more rapidly and more effectively. In the apparatus which I provide intimate contact may be obtained between the liquid and gas repeatedly in the same unit and also successively as the liquid and gas pass through the various units. In addition, the apparatus which I provide is so arranged that the gas entering the unit is initially contacted with liquid which has already been utilized for the treatment of gas and as the gas passes through the apparatus it is contacted with increasingly fresh liquid until in the last unit of the apparatus fresh liquid contacts the already previously contacted gas.

By my invention I have provided an improved apparatus for obtaining the various objects set forth above and kindred objects and the principles to be followed in constructing such apparatus will be hereinafter set forth. For the purpose of illustrating these principles I have shown in the drawings a preferred embodiment of the apparatus which I provide by my invention. It will be understood, of course, that the embodiment shown in the drawings is merely illustrative, and that my invention is not limited to the specific details of such embodiment.

In the drawings:—

Figure 1 is an elevational view of the apparatus which I provide;

Figure 2a is a vertical sectional view through a portion of the apparatus shown in Figure 1, the top portion thereof being severed along the line A—B of Figure 2a;

Figure 2b is a vertical sectional view of that portion of the apparatus shown in Figure 1 above the line A—B of Figure 2a;

Figure 3 is a transverse sectional view taken along the line III—III of Figure 2b;

Figure 4 is a transverse sectional view taken along the line IV—IV of Figure 2a;

Figure 5 is a transverse sectional view taken along the line V—V of Figure 2a;

Figure 6 is a detail view showing the manner in which the various units of the apparatus are connected together at the diaphragms dividing the unit; and Figure 7 is a detail view showing the baffles arranged below the conducting tubes for connecting the gas between the units.

In the embodiment shown in the drawings three contact units 2, 3 and 4 are provided. These contact units are arranged vertically one above the other, the contact unit 2 comprising the base unit, the contact unit 3 the intermediate unit and the contact unit 4 the upper unit. The casing 5 enclosing the apparatus and through which the gas travels is formed of a plurality of sections, the section 6 enclosing the lower contact unit, the section 7 enclosing the intermediate contact unit, the section 8 enclosing the upper contact unit and the top section 9 enclosing a separator 10 for eliminating particles of liquid which may have been entrapped by the gas during its passage through the unit. The lower section 6 is provided with a peripheral flange 11 adjacent the top edge thereof for cooperation with a peripheral flange 12 adjacent the lower end of the section 7. The intermediate section 7 is provided with a flange 13 arranged to cooperate with a flange 14 at the lower end of the section 8 of the casing. The upper end of the section 8 is provided with a similar flange 15 for cooperation with a flange 16 carried by the top section of the casing. Adjacent flanges are arranged to cooperate with each other and are provided with a plurality of holes therethrough arranged to receive bolts 17 for rigidly securing the sections together.

A transverse diaphragm 18 separates the lower contact unit from the intermediate contact unit and a similar diaphragm 19 separates the intermediate contact unit from the upper unit. A somewhat similar diaphragm 20 is provided for separating the upper contact unit from the cap portion carrying the separator 10. These diaphragms are conveniently mounted between the respective sections housing the various contact units.

The lower contact unit 2 is provided with a transversely extending tray 26 dividing it into an upper compartment 27 and a lower compartment 28. The tray 26 has a plurality of tubes 29 extending therethrough for permitting gas to pass from the lower compartment 28 into the upper compartment 27. These tubes may be placed in any desired arrangement and any suitable number thereof may be provided. A plurality of tubes 30 are also carried by the tray 26 for permitting the return of liquid from the upper compartment 27 to the lower compartment 28.

The intermediate unit 3 is likewise provided with a tray 31 for dividing it into an upper compartment 32 and a lower compartment 33. The tray 31 is likewise provided with a plurality of tubes 34 extending through the tray for providing gas passageways from the lower compartment 33 to the upper compartment 32. A plurality of return pipes 35 also extend through the tray 31 for returning liquid from the upper compartment 32 into the lower or liquid compartment 33.

The upper contact unit 4 is provided with a similar tray 36 for dividing it into an upper compartment 37 and a lower or liquid compartment 38. A plurality of tubes 39 extend through the tray 36 and provide passageways for the gas to travel from the lower compartment 38 into the upper compartment 37. A plurality of tubes 40 also extend through the diaphragm 36 for providing for return flow of liquid from the upper compartment 37 to the lower compartment 38.

It will be understood that any number of liquid return tubes and gas passageways may be provided in each of the units above described. The number and arrangement thereof may be varied to suit the particular conditions for which the apparatus is to be used.

The lower unit 2 is provided with a gas inlet 41 through which the gas to be treated or to be used to treat the liquid enters the apparatus. This inlet is provided below the tray 26 but above the normal level 42 of the liquid in the lower unit. The entering gas passes over the surface of the liquid past the release edge of each tube, i. e., the lower edge thereof, and upwardly through the tubes 29 and into the upper compartment 27 of the lower contact unit. As the gas passes beneath the release edge of each tube, the liquid adjacent thereto is heaped into substantially a cone shape and particles of liquid are broken off and may be carried upwardly through the tubes 29 an appreciable distance. Under certain conditions of operation, particles of liquid may be carried completely through these tubes and into the upper compartment of the contact unit. The extent to which the liquid is carried upwardly through the tubes will, of course, be dependent upon the particular conditions of operation prevailing. The operation of a contactor of this character is clearly described in the co-pending application of Donald A. Sillers, Serial No. 587,684. No further description of the manner in which the intimate contact between the liquid and gas is effected is deemed necessary. Reference may be had to this application for a further description of the operation of a contact unit of this character under various different conditions.

After the gas enters the upper compartment 27 it passes upwardly through a plurality of tubes 43 connected with openings in the dividing diaphragm 18. These tubes are of sufficient length to cause the gas to enter the lower compartment 33 of the intermediate contact unit above the normal level 44 of the liquid therein. The gas then passes downwardly around the tubes 43 across the surface of the liquid past the release edges of the tubes 34 and upwardly therethrough, this action again effecting an intimate contact between the liquid in the contact and the gas passing therethrough. The gas continues upwardly through the upper compartment 32 through appropriate openings in the diaphragm 19 through tubes 45 which extend above the level of the liquid in the upper unit. These tubes terminate in the lower compartment of the upper contact unit but above the liquid level 46 therein, so that the gas can again be intimately contacted with the liquid passing through the unit. The gas then passes across the surface of the liquid past the release edges of the tubes 39 and upwardly through the tubes into the upper compartment 37 of the upper contact unit. The gas then passes upwardly through the opening 47 in the diaphragm 20 into and through a separator 10 which is provided as stated above for removing any excess liquid entrapped by the gas during its passage through the unit. The gas then continues to pass upwardly and out of the contact apparatus through the outlet 48.

The bottoms of the pipes 43 and 44 are protected from any spray of liquid which may come up the contactor tubes by funnel-shaped baffle plates 49 and 50. These not only prevent the direct passing of spray up through the pipe but operate to collect any drip that may come down through the pipes and deposit it through smaller tubes 51 and 52 respectively below the level of the contactor tubes. This baffle arrangement assists in rendering the device effective but need not be of the particular form shown. In fact, the apparatus will function quite satisfactorily even without these baffles and return tubes as the passage of a slight amount of spray from one contactor unit to another will not seriously impair the efficiency of the apparatus.

In ordinary operation an appreciable amount of spray will be carried up through the contactor tubes 29, 34 and 39 and be deposited on the trays 26, 31 and 36. The tubes 30, 35 and 40 are provided for returning at least a portion of this liquid to the body of liquid in the respective contact units in the event that more than the desired quantity of the liquid collects on the trays. The apparatus shown in the drawings may be so operated that a considerable quantity of liquid is being constantly returned from above the tray of any particular unit to the body of liquid in the same unit so as to effect repeated contact of the liquid in a single unit. It may be desirable in many cases to so control the operation of the apparatus that the liquid will contact repeatedly in the one contactor with gas passing therethrough.

The liquid is supplied to the apparatus through an inlet pipe 53 having a control valve 54 therein. This inlet supplies the liquid to the upper contact unit below the tray 36 therein. Intimate contact between the liquid and the gas in the upper compartment is effected and liquid passed upwardly through the contactor tube and into the upper compartment 37. The liquid may then be fed downwardly through the pipe 55 into the lower compartment 33 of the intermediate contactor. A control valve 56 is provided in the liquid connection between the upper unit and the intermediate unit for controlling the flow of liquid therebetween. Intimate contact between the liquid in and the gas passing through the second compartment is effected and the liquid collecting on the tray 31 is passed downwardly through the pipe 57 past a control valve 58 into the body of liquid in the lower compartment of the bottom unit. The valve 58 is provided in this connection for the purpose of regulating the flow of liquid from the one contact unit to the other.

An outlet 59 with a valve 63 is provided above the tray 26 in the lower contact unit for removing the spent liquid from the apparatus.

Gauge glasses 60, 61 and 62 are provided on the contact units for registering the quantity of liquid contained therein at any given time.

It will be understood that in operation the liquid stands in the bottom compartment and on each diaphragm to a level close to the bottom of the contactor tubes. This is for the purpose of effecting an appropriate intimate contact between the liquid and the gas.

In operation the liquid is admitted at the liquid inlet until there is sufficient in the upper contact unit, whereupon the valve 56 is opened to permit some liquid to flow into the intermediate unit. This liquid does not reach the intermediate contactor until after it has passed through and been treated in the upper contact unit. Similarly, the liquid reaches the lower contact unit after passing through and being treated in the intermediate contact unit so that the liquid is treated successively first in the upper contact unit, then in the intermediate contact unit and, finally, in the lower unit. The liquid passes downwardly through the apparatus while the gas passed upwardly and, consequently, the liquid which has been subjected to most treatment at the bottom is contacted first with gas which has been subjected to no treatment, and the fresh liquid admitted at the top is contacted with the gas that has received previous treatment with other liquid. By this means the freshest liquid is caused to interact with gas which has received most treatment, and the liquid which has received most treatment is made to interact with gas which has received least. In this manner the maximum amount of efficiency in the carrying out of the treatment or contacting is secured.

In the apparatus above described while the gas passes through each contact unit only once and the liquid in that contactor is circulated through the tubes any desired number of times, it will be obvious that the proper amount of liquid may be admitted to operate all three contact units for a given period and during such operation all the valves closed and that then, for a short period of time, the valves may be opened and fresh liquid run in while the liquid is changed a certain amount and it may then be run for a period of time with the valves closed. It is also obvious that the rate at which the liquid is admitted may be adjusted by means of the valve 54, or the rate at which it is permitted to flow from one contact unit to the other may be adjusted by means of the valves 56 and 58 so that after once operations have commenced, the apparatus may be operated with a continual flow of liquid through the pipe lines although the liquid may be retained for a considerable period in flowing through each of the contact units and circulating therein any desired number of times.

It will be apparent from the above that a maximum amount of efficiency is obtained in the apparatus which I provide and also that it has a considerable degree of flexibility to care for the various operating conditions or uses to which it is put.

While I have shown and described a preferred embodiment of my invention, it will be understood that I do not intend to be limited thereby, and that my invention may be otherwise embodied within the scope of the appended claims.

I claim:

1. A liquid and gas contact apparatus comprising a chamber, a transverse partition dividing said chamber into an upper compartment and a lower compartment, a conduit opening through the partition and projecting into the lower compartment to permit upward circulation of gas and liquid therethrough, means for supplying gas to the lower compartment, a second chamber, a transverse partition dividing said second chamber into an upper and a lower compartment, a conduit opening through the partition and projecting into the lower compartment of said second chamber to permit upward circulation of gas and liquid therethrough, said conduit extending upwardly into the upper compartment of said second chamber, a wall separating said chambers, said chambers being arranged in superposed relationship, a conduit opening through said wall connecting the adjacent upper and lower compartments of said chambers and projecting into the lower compartment of said second chamber, means for supplying liquid to the lower compartment of said second chamber, a conduit located externally of said chambers opening into the upper compartment of said second chamber at a point spaced below the upper end of said conduit and opening into the lower compartment of said first-mentioned chamber at a point below the normal liquid level for supplying liquid from said second chamber to said first-mentioned chamber, a regulating valve for controlling the flow of liquid between said second chamber and said first chamber, means for withdrawing gas from the upper compartment of said second chamber, and a second conduit opening through the partition in said second chamber and extending upwardly into the upper compartment of said second chamber to a point above said externally located conduit and extending downwardly into the lower compartment of said second chamber to a point below the normal liquid level therein.

2. A liquid and gas contact apparatus comprising a chamber, a transverse partition dividing said chamber into an upper compartment and a lower compartment, a conduit opening through the partition and projecting into the lower compartment to permit upward circulation of gas and liquid therethrough, means for supplying gas to the lower compartment, a second chamber, a transverse partition dividing said second chamber into an upper compartment and a lower compartment, a conduit opening through the partition and projecting into the upper and lower compartments of said second chamber to permit upward circulation of gas and liquid therethrough, a wall separating said chambers, said chambers being arranged in superposed relationship, a conduit opening through said wall connecting the adjacent upper and lower compartments of said chambers and projecting into the lower compartment of said second chamber, means for supplying liquid to the lower compartment of said second chamber, a second conduit opening through the partition in said second chamber and extending upwardly into the upper compartment thereof and downwardly into the lower compartment thereof to a point below the normal level of liquid therein to permit recirculation of liquid within said chamber, a similar conduit opening through the partition of said first-mentioned chamber to permit recirculation of liquid within said chamber, means for supplying liquid from the upper compartment of said second chamber to the lower compartment of said first-mentioned chamber, said second conduit extending upwardly through the partition in said second chamber to a point above the means for supplying liquid from the upper compartment of said second chamber to the lower compartment of said first-mentioned chamber, a regulating valve for controlling the flow of liquid between said second chamber and said first chamber, and means for withdrawing gas from the upper compartment of said second chamber.

WILLARD P. CHANDLER, Jr.